Feb. 5, 1924.
A. D. McNAIR
ELECTRIC FENCE
Filed July 23, 1921
1,483,005
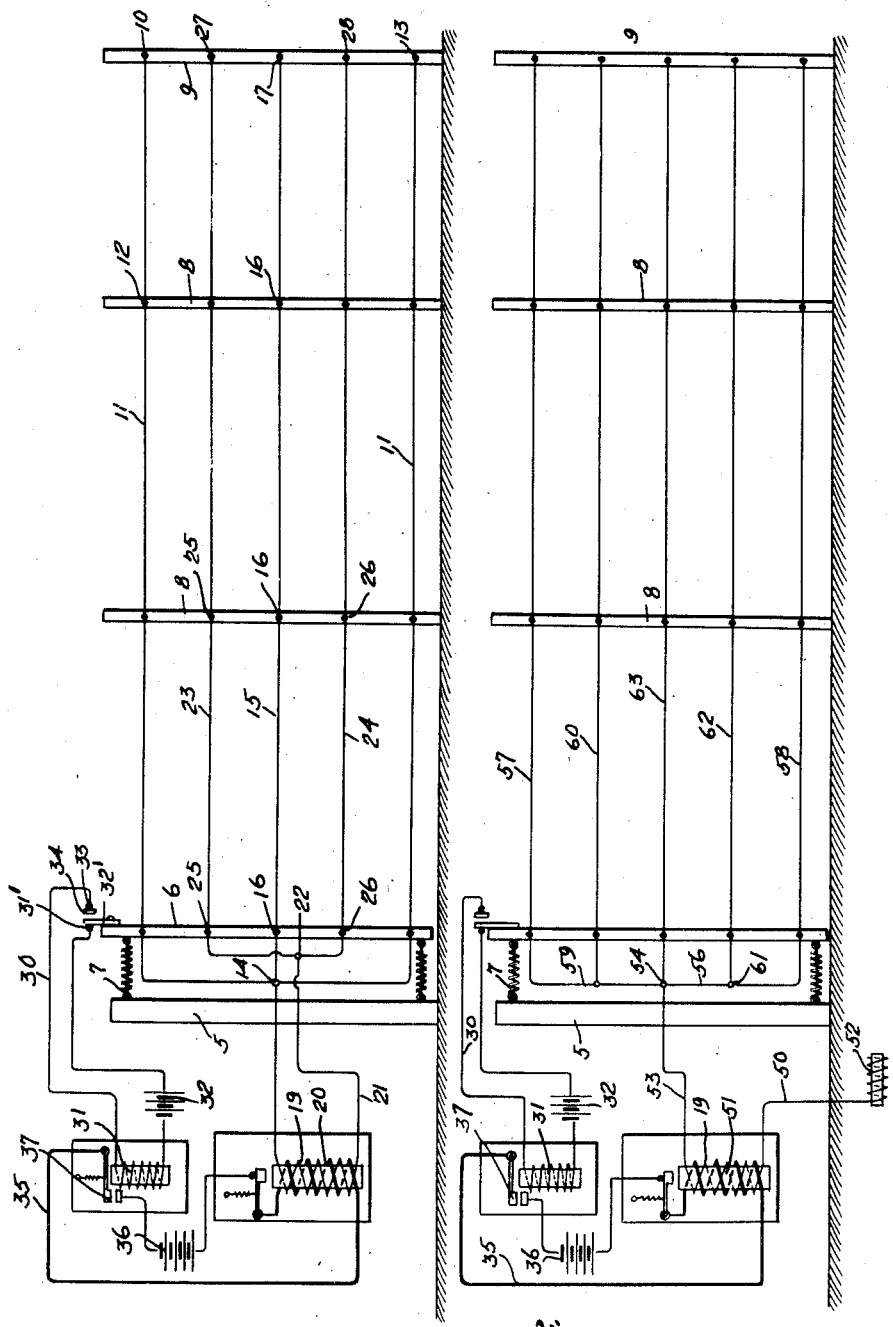
WITNESSES
INVENTOR
ALBERT D. McNAIR.
BY
ATTORNEYS Patented Feb. 5, 1924.

1,483,005

UNITED STATES PATENT OFFICE.

ALBERT DUY McNAIR, OF FAYETTEVILLE, ARKANSAS.

ELECTRIC FENCE.

Application filed July 23, 1921. Serial No. 486,979.

*To all whom it may concern:*

Be it known that I, ALBERT DUY MCNAIR, a citizen of the United States, and a resident of Fayetteville, in the county of Washington and State of Arkansas, have invented a new and Improved Electric Fence, of which the following is a full, clear, and exact description.

The present invention relates to new and useful improvements in farm fences, and pertains more particularly to fences of the electric type for confining live stock within certain limits.

Heretofore fences of this type have been constructed, but it is the common practice in these fences to maintain the wires energized at all times, which construction and principle of operation greatly increases the cost of maintenance since it necessitates a constant running expense in keeping the wires energized.

It is one of the primary objects of the present invention to so construct a fence of this character that the wires thereof are only energized at a time when an animal attempts to pass through the fence.

It is a further object of the invention to so construct a fence of this character that the animal in its endeavor to pass through the fence automatically energizes the wires of said fence.

It is a still further object of the invention to provide a relay circuit which relay circuit is operated by the animal to close a high tension circuit, it being understood that the wires of the fence constitute a portion of or all of the high tension circuit.

With the above and other objects in view which will appear as the nature of the invention is better understood, reference is had to the accompanying drawings, in which Figure 1 is a schematic view of a fence constructed in accordance with the present invention;

Fig. 2 is a similar view of a slightly modified form of the invention.

Referring to the drawings and more particularly to Figure 1, the reference character 5 designates a post and carried by said post is an end post 6. This end post is a floating post and is connected with post 5 by means of tension spring 7. The reference character 9 designates the last fence post in the direction in which the fence runs or it may designate the post where the direction of the fence changes. Between the posts 6 and 9 are a plurality of posts 8 at such intervals that the fence wires will remain practically parallel with the surface of the ground throughout their length. The posts 8, like posts 5 and 9, are secured in the ground.

Secured to the post 9 as at 10 is a wire 11 and said wire is secured to the posts 6 and 8 as at 12, it being understood that the points of connection of the wire 11 of the several posts is in the form of an insulated member through which the wire 11 passes whereby the wire is slidable through the insulator. This wire 11 extends to the bottom of the several posts 6, 7 and 9, and is fastened to the post 9 as at 13. Connected to the wire 11, as at 14, is a wire 15 fastened as at 16 to the several posts 6 and 8, and to the post 9 as at 17. The wire 15 is connected in any desired manner to the secondary winding 19 of an induction coil 20. The secondary winding 19 of the induction coil 20 is further suitably connected to a wire 21, and said wire 21 is connected as at 22 to two wires 23 and 24, which wires 23 and 24 are secured to the several posts 6 and 8 as at 25 and 26, respectively. The wire 23 is connected to the post 9, as at 27, and the wire 24 is connected to the post 9, as at 28.

Whenever the fence is used as a portable fence to divide a field into two or more parts the post 9 will establish the end post at the outer end of the fence as post 6 is the end floating post at the inner end of the fence. If, however, the fence is intended to enclose two or more sides of a field, post 9 will establish a corner post and there will be similar corner posts mounted at the other corners. In this case, the fence wires 11, 15, 23 and 24 will be inserted through pulleys at the corner post, such pulleys being insulated from the post. The pulleys are not shown but have been described in order to show more clearly that the wires are slidable relative to the fence post for operating the floating post 6. It must be further understood that more than one fence may be energized directly because there may be as many as four fences or more running from the four different sides of post 5, each fence having its own floating post 6 and its own electrical contact points.

The reference character 30 designates a circuit for the relay 31, and connected in said circuit is a suitable source of electric current supply 32 in the form of a battery or other suitable supply medium. One of the wires of the circuit 30 is connected as at 31' to a contact member 32', the other wire being connected as at 33 to a contact member 34. The contact member 32' is carried by the end post 6 heretofore described and is adapted to be moved into engagement with the contact member 34 in a manner to be hereinafter more fully described.

The reference character 35 designates the primary winding of the induction coil 20 and mounted in said primary winding is a suitable source of current supply 36, which may be in the form of a battery or other source of supply. Mounted in the primary winding is a circuit-closing device 37, which circuit-closing device is operated by the magnet of the relay 31 to close the primary winding of the induction coil 20.

This form of the device operates in the following manner: Assuming that the animal attempts to break through the fence immediately upon strain being applied thereto this strain will be transmitted along the wires and through the insulators or pulleys, when used, to the end floating post 6 which will move against the action of the tension spring 7 and away from the post 5. This stretching of the fence moves the contact member 32' into engagement with the contact member 34 and a circuit is immediately completed through the relay 31. Upon energizing the magnet of the relay 31, the primary circuit of the induction coil is closed through the medium of the circuit-closing device 37, which operation causes the energization of the several wires 11, 15, 23 and 24. Upon energization of these wires, the circuit being of high tension character, the animal exerting the strain upon the fence will immediately receive a shock and as a consequence thereof will voluntarily move away from the fence, thus relieving the pressure thereon. Upon the relief of pressure upon the several wires of the fence, the tension springs 7 will contract and will disengage the contact member 32' from the contact member 34, thus breaking the circuit to the relay 31, which will in turn break the circuit in the primary winding of the induction coil 20 and the fence immediately becomes de-energized.

In the form of the invention shown in Fig. 2, the reference character 50 disengages one end of the secondary winding of an induction coil 51, said end 50 of the primary winding being grounded as at 52. The other end of the primary winding indicated by the reference character 53 is connected as at 54 to a wire 56, which has two horizontal branches 57 and 58, which form the upper and lower wires, respectively, of the fence. Connected to the wire 56, as at 59, is a longitudinal wire 60, and connected to the wire 56 as at 61, is a second longitudinal wire 62.

Extending longitudinally of the fence between the wires 60 and 62, is a longitudinal wire 63, and said wire is connected as at 54 to the wire 56. The remainder of the fence in this form of the invention is identical with that described and shown in Fig. 1.

The embodiment of the invention shown in Fig. 2 operates in the same manner as that in Fig. 1, the difference in construction between the two forms being that in Fig. 1 the longitudinal wires of the fence are alternately positive and negative and the animal receives a shock by passing portions of his body between said wires in contact therewith. In Fig. 2, however, the animal receives a shock upon contact with any of the wires, the current passing through the animal's body to the ground.

While in the present instance I have shown a relay, it is obvious that where the source of current supply is in the immediate vicinity of the fence, said relay is not necessary, it being only used in such cases where the source of current supply is remotely removed from the locality of the fence.

Furthermore, in the foregoing illustration of the invention I have shown tension springs used in combination with a floating fence post, but I do not wish to be limited to this construction since it is obvious that any form of circuit-closing device for the relay circuit might be employed without departing from the spirit of the invention.

In the form of the invention shown in Fig. 2 it is obvious that it is only necessary to energize one of the wires when the fence is used to confine animals of the larger varieties, and such a system of wiring could be resorted to without departing from the spirit of the invention.

From the foregoing it is clearly apparent that the present invention provides a fence in which the current is present only upon the actual attempt of an animal to pass through the fence, thus greatly reducing the cost of operation and maintenance of the device as compared with those fences in which the longitudinal wires are constantly energized.

I claim:

1. In an electric fence in which the fence wires constitute a normally open circuit, means for automatically closing said circuit upon application of pressure to the fence wires.

2. In an electric fence in which the fence wires constitute a normally open circuit, a freely movable post for supporting said wires, and means operated upon movement of said post to close said normally open circuit.

3. An electric fence comprising a normally open circuit, and means operated to close said circuit upon application of pressure to the fence.

4. In an electric fence, a plurality of longitudinally extending wires, constituting a normally open electric circuit, means for supporting said wires, said supporting means being movable upon application of pressure to the fence, and means operated by movement of the fence-supporting means to close said electric circuit, substantially as described.

5. In an electric fence, a main circuit normally open, a relay circuit normally open, and means operated by pressure upon the fence for closing the relay circuit, and separate means operated by the closing of the relay circuit to close the main circuit and energize the fence upon application of pressure thereon.

ALBERT DUY McNAIR.